(12) United States Patent
Endo et al.

(10) Patent No.: US 7,822,257 B2
(45) Date of Patent: Oct. 26, 2010

(54) OBSERVATION APPARATUS AND OBSERVATION METHOD

(75) Inventors: Hideaki Endo, Tokyo (JP); Akitsugu Kagayama, Tokyo (JP); Atsuhiro Tsuchiya, Tokyo (JP); Kazuhiro Hasegawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 1083 days.

(21) Appl. No.: 11/517,874

(22) Filed: Sep. 8, 2006

(65) Prior Publication Data
US 2007/0070498 A1 Mar. 29, 2007

(30) Foreign Application Priority Data

Sep. 12, 2005 (JP) ............................. 2005-264005
Aug. 7, 2006 (JP) ............................. 2006-214973

(51) Int. Cl.
*G06K 9/00* (2006.01)
(52) U.S. Cl. .................. 382/133; 382/100; 382/128; 348/207.99; 348/207.1; 348/79; 250/458.1
(58) Field of Classification Search ............... 382/128, 382/133; 348/207.99, 207.1, 207.11, 211.13
See application file for complete search history.

(56) References Cited

U.S. PATENT DOCUMENTS

| | | | | |
|---|---|---|---|---|
| 4,000,417 | A * | 12/1976 | Adkisson et al. | 250/201.4 |
| 4,818,169 | A * | 4/1989 | Schram | 414/331.18 |
| 6,711,283 | B1 * | 3/2004 | Soenksen | 382/133 |
| 2003/0161515 | A1 * | 8/2003 | Salmon et al. | 382/128 |
| 2003/0161545 | A1 * | 8/2003 | Gallagher | 382/266 |
| 2003/0227673 | A1 * | 12/2003 | Nakagawa | 359/380 |
| 2004/0105575 | A1 * | 6/2004 | Ganz et al. | 382/128 |
| 2004/0119817 | A1 | 6/2004 | Maddison et al. | |

(Continued)

FOREIGN PATENT DOCUMENTS

EP  1 324 097 A2  7/2003

(Continued)

OTHER PUBLICATIONS

Blizzard Entertainment, Warcraft: Orcs and Humans Game Manual, Published by Blizzard Entertainment, 1995.*

(Continued)

*Primary Examiner*—Andrew W Johns
*Assistant Examiner*—Jason Heidemann
(74) *Attorney, Agent, or Firm*—Holtz, Holtz, Goodman & Chick, PC

(57) ABSTRACT

An observation apparatus includes an incident-light illumination optical system, a transmitting illumination optical system, an imaging unit, an input device, a storage unit, an imaging controller, a microscope controller, an imaging information management unit. The imaging information management unit compares an area position, of an imaging area of the imaging unit, indicated by position information input from the input device with an area position stored in the storage unit to determine whether the area position indicated by the position information is stored in the storage unit. When the area position is not stored in the storage unit, the imaging controller controls the imaging unit to image the specimen and to generate an observation image, and stores the observation image in the storage unit. The microscope controller controls one of the optical systems to illuminate the specimen only during an imaging period, when the imaging unit images the specimen.

19 Claims, 15 Drawing Sheets

U.S. PATENT DOCUMENTS

2005/0082494 A1 4/2005 Motomura
2006/0232854 A1* 10/2006 Watanabe .................. 359/368

FOREIGN PATENT DOCUMENTS

JP 2002-277754 A 9/2002
JP 2005-234435 A 9/2005

OTHER PUBLICATIONS

Nguyen, Quoc-Thang, et al, Physics Department, University of California, San Diego, California, "MPScope: A versatile software suite for multiphoton microscopy", *Journal of Neuroscience Methods*, Elsevier Science Publisher, B.V., Amsterdam, NL, vol. 156, No. 1-2, Sep. 30, 2006, XP005609718, ISSN: 0165-0270, pp. 351-359.

* cited by examiner

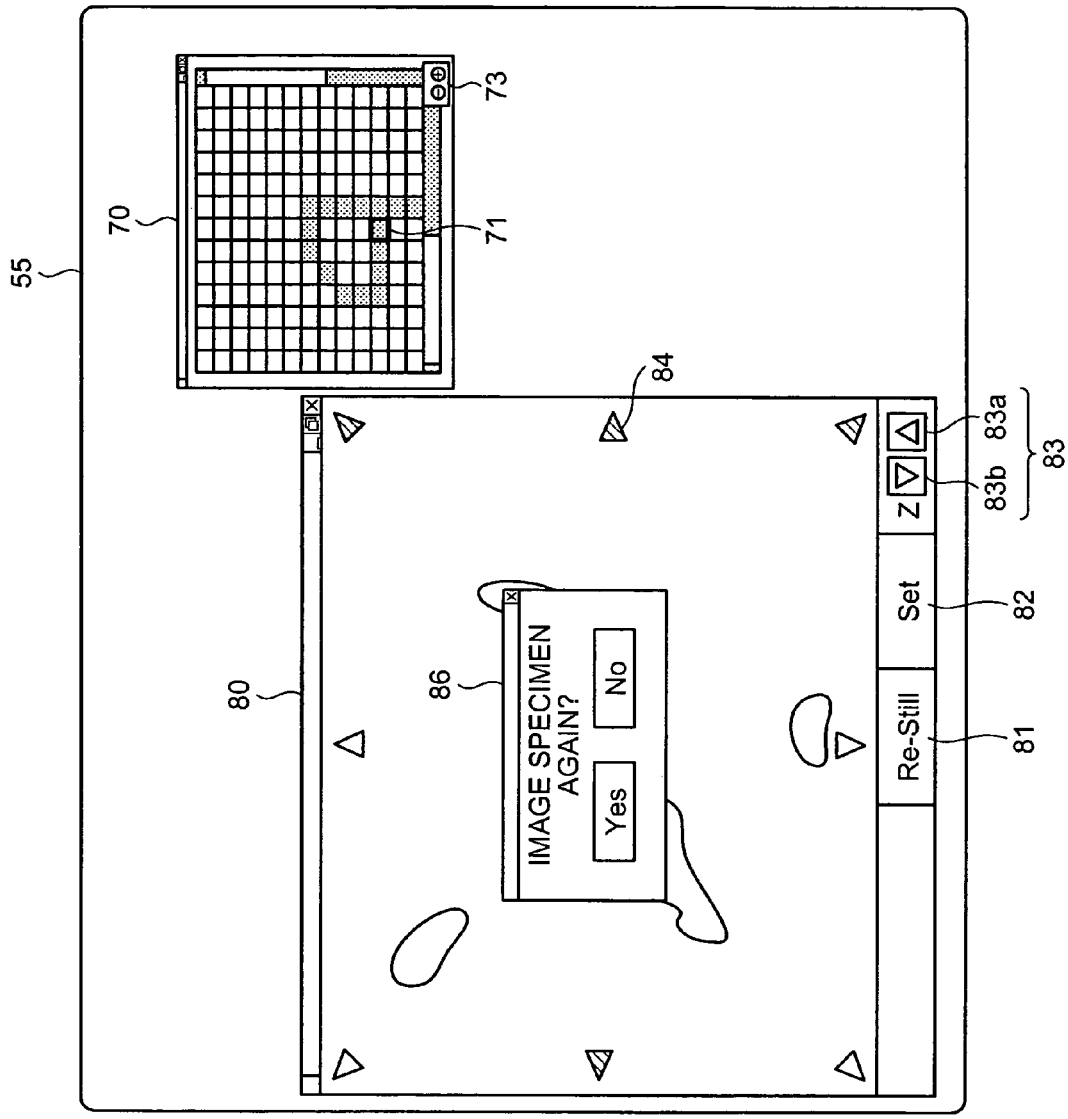

OBSERVATION APPARATUS AND OBSERVATION METHOD

CROSS-REFERENCE TO RELATED APPLICATIONS

This application is based upon and claims the benefit of priority from Japanese Patent Application No. 2005-264005, filed Sep. 12, 2005 and No. 2006-214973, filed Aug. 7, 2006, the entire contents of which are incorporated herein by reference.

BACKGROUND OF THE INVENTION

1. Field of the Invention

The present invention relates to an observation apparatus and an observation method for observation of a specific region of a specimen.

2. Description of the Related Art

One conventional technique of microscopy of a specimen, such as a living cell, includes capturing an image of the specimen at time intervals (hereinafter such a manner of image-taking will be referred to as time lapse imaging) to generate an observation image, and reproducing a series of observation images after the time-lapse imaging is finished, thereby observing a moving picture to check a morphological change in the specimen over time. Such a conventional technique is considered to be highly effective for an observation of temporal change in the specimen.

In recent years, the time lapse imaging is sometimes performed at plural imaging positions, for example, when living cells cultured under the same condition are tested with plural types of agents for confirmation of the effect of the agents, or when temporal changes of different cells are observed under the same environment.

When the time lapse imaging is performed at plural imaging positions (this manner of image-taking will be hereinafter referred to as multipoint time lapse imaging), the plural imaging positions are not always located in a viewing field of one microscope. Even if the imaging positions reside on one particular living cell under the observation, one or more imaging positions are often located outside the viewing field of the microscope. In addition, plural imaging positions often reside respectively on different living cells.

One conventional imaging technique to accommodate the inconveniences described above is described in Japanese Patent Application Laid-Open No. 2002-277754 (KOKAI). A structure and a method described in JP-A No. 2002-277754 (KOKAI) allow for the multipoint time lapse imaging. The described method includes steps of placing a specimen containing living cells on a stage whose positioning is electrically controllable along X, Y, and Z axes, and previously setting positional coordinates of plural imaging positions, exposure of an imaging element at the imaging positions, a time interval of the time lapse imaging for each imaging position, and the number of images to be captured.

When the multipoint time lapse imaging is performed, a screening is performed to set the imaging positions before an actual imaging starts. Conventionally, during the screening, a specimen, i.e., living cells are irradiated with an exciting light, a live image of the specimen is displayed, and an operator sets the imaging positions while looking at the live image.

While the live image is displayed for the screening, the living cells are kept irradiated with the exciting light. The irradiation with the exciting light, however, causes discoloration and damages of the living cells, and preferably be suppressed as far as possible.

SUMMARY OF THE INVENTION

An observation apparatus according to one aspect of the present invention includes an illumination unit that illuminates a specimen; an imaging unit that images the specimen to generate an observation image; a moving unit that moves the specimen with respect to the imaging unit; an information obtaining unit that obtains position specifying information for specifying an area position of an imaging area in the specimen with respect to the imaging unit; a storage unit that stores the observation image and the area position of the imaging area recorded in the observation image which are associated with each other; and a movement controller that controls the moving unit to move the specimen so that the area position specified by the position specifying information is moved to an imaging range of the imaging unit. The observation apparatus also includes a matching unit that compares the area position specified by the position specifying information with the area position stored in the storage unit to determine whether the area position specified by the position specifying information is stored in the storage unit, when the area position specified by the position specifying information is moved to the imaging range; an imaging controller that controls the imaging unit to image the imaging area corresponding to the area position specified by the position specifying information to generate an observation image, and stores the observation image in the storage unit, when the area position specified by the position specifying information is not stored in the storage unit; a position storing controller that stores the area position of the imaging area recorded in the observation image in the storage unit, when the imaging controller stores the observation image in the storage unit; and an illumination controller that controls the illumination unit to illuminate the specimen only during an imaging period when the imaging unit images the imaging area.

An observation method according to another aspect of the present invention includes obtaining position specifying information for specifying an area position of an imaging area in the specimen with respect to an imaging unit; controlling the moving unit to move the specimen so that the area position specified by the position specifying information is moved to an imaging range of the imaging unit; comparing the area position specified by the position specifying information with the area position stored in a storage unit to determine whether the area position specified by the position specifying information is stored in the storage unit, when the area position specified by the position specifying information is moved to the imaging range; controlling the imaging unit to image the imaging area corresponding to the area position specified by the position specifying information to generate an observation image; storing the observation image in the storage unit, when the area position specified by the position specifying information is not stored in the storage unit; storing the area position of the imaging area recorded in the observation image in the storage unit, when the observation image is stored in the storage unit; and controlling an illumination unit to illuminate the specimen only during an imaging period when the imaging unit images the imaging area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 shows a message window, for reimaging a specimen, displayed on the image display window of FIG. 4;

DETAILED DESCRIPTION OF THE PREFERRED EMBODIMENTS

Exemplary embodiments of the present invention will be described below with reference to the accompanying drawings.

Figure 1:
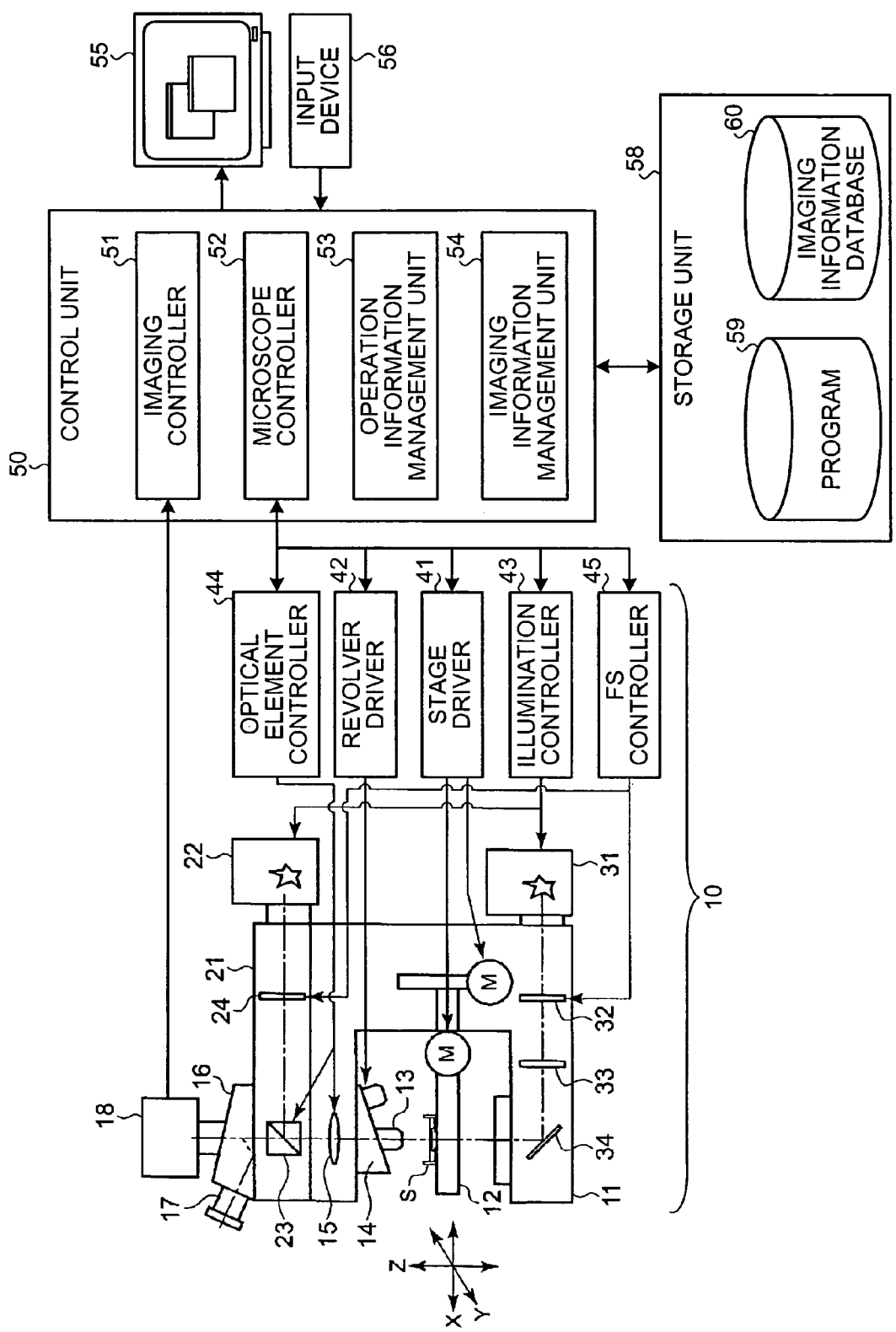
FIG. 1 is a schematic diagram of a living cell observation apparatus in accordance with a first embodiment of the present invention.

FIG. 1 is a schematic diagram of an observation apparatus in accordance with a first embodiment of the present invention.

The observation apparatus includes a microscope 10. The microscope 10 includes a microscope body 11, an intermediate lens barrel 21 arranged over the microscope body 11, and an eyepiece lens barrel 16 arranged on the intermediate lens barrel 21.

The microscope body 11 has an electromotive stage 12 which is movable in a three-dimensional direction (XYZ directions), and a revolver 14 which can hold plural objective lenses 13. Generally, the objective lenses 13 with different magnifications are attached to the revolver 14, and one of the attached objective lenses 13 is arranged on an optical path of the microscope 10. A specimen S is placed on the electromotive stage 12. The specimen S contains plural living cells that rest in a lower portion of a transparent container filled with culture solution, for example. The electromotive stage 12 has plural built-in motors M, and is capable of moving the specimen S placed thereon in a three-dimensional manner relative to the objective lens 13.

A transmitting illumination light source 31 is attached to the microscope body 11. The microscope body 11 has a field shutter (FS) 32, a neutral density (ND) filter 33, and a mirror 34. The transmitting illumination light source 31, the field shutter 32, the ND filter 33, and the mirror 34 together form a transmitting illumination optical system which serves to illuminate the specimen S from below.

An incident-light illumination light source 22 is attached to the intermediate lens barrel 21. The intermediate lens barrel 21 has a field shutter 24. Further, necessary optical elements are arranged inside the intermediate lens barrel 21 as appropriate for various types of microscopy, such as polarization, phase difference, Nomarski, and fluorescent microscopies. Such optical elements are, for example, various filters and polarizing element, and denoted collectively by reference character 23. Further, a variable power lens 15 is arranged as appropriate inside the microscope body 11 so that an observation magnification can be easily changed. The incident-light illumination light source 22, the optical element 23, the variable power lens 15, and the objective lens 13 together form an incident-light illumination optical system that serves to illuminate the specimen S from above.

The eyepiece lens barrel 16 includes an eyepiece 17 which allows an observation of the specimen S with a naked eye, and an imaging unit 18 which serves to capture the image of the specimen S and to generate a specimen image as an observation result. The imaging unit 18 may include a charge-coupled device (CCD), for example, though not limited thereto.

The microscope further includes a stage driver 41, a revolver driver 42, an illumination controller 43, an optical element controller 44, and an FS controller 45.

The stage driver 41 drives the electromotive stage 12 in a horizontal direction (XY direction drive) and in a vertical direction (Z direction drive) in order to change an area position of the specimen S of the imaging unit 18. Here, the term "area position" denotes a position of an imaging area positioned by the electromotive stage 12 in XYZ coordinates system.

The revolver driver 42 rotates the revolver 14 to arrange the objective lens 13 of a desired magnification on the optical path.

The illumination controller 43 serves to control various lighting necessary for the imaging. For example, the illumination controller 43 turns on and turns off the incident-light illumination light source 22 that illuminates the specimen S from above and the transmitting illumination light source 31 that illuminates the specimen S from below, while adjusting the amount of light of the light sources 22 and 31.

The optical element controller 44 arranges the optical element 23 on the optical path, retracts the optical element 23 from the optical path, and exchanges the variable power lens 15.

The FS controller 45 controls the field shutters 24 and 32 so that the transmitting illumination optical system and the incident-light illumination optical system illuminate only the imaging area set for the imaging by the imaging unit 18.

The observation apparatus further includes a control unit 50, a monitor 55 that displays the specimen image and various pieces of information, an input device 56, and a storage unit 58 that stores the specimen image, a coordinates of the imaging position, an imaging condition, and the like. The control unit 50 includes an imaging controller 51, a microscope controller 52, an operation information management unit 53, and an imaging information management unit 54. The imaging controller 51 serves as an imaging and display controller. The microscope controller 52 serves as a position recording controller, and an illumination controller. The operation information management unit 53 serves as an information display controller. The imaging information management unit 54 serves as a matching unit, a redisplay controller, and a Z position prediction unit.

The control unit 50 includes a central processing unit (CPU), a random access memory (RAM), and the like. The input device 56 includes, for example, a pointing device such as a mouse, and a keyboard. The storage unit 58 is, for example, a hard disk drive. The storage unit 58 stores a program 59 and an imaging information database 60. The program 59 includes, for example, a program for operating the CPU as the imaging controller 51, the microscope controller 52, the operation information management unit 53, and the imaging information management unit 54, and a program for controlling the imaging unit 18, the imaging controller 51, and the microscope controller 52 to perform a time lapse imaging of a previously designated area. The program used here operates based on Microsoft Windows® as basic software, for example, and various commands are given via the input device 56.

The microscope controller 52 controls the stage driver 41, the revolver driver 42, the illumination controller 43, the optical element controller 44, and the FS controller 45, and makes these units perform necessary operations for the imaging. The imaging controller 51 performs various controls of the imaging unit 18 according to a previously set imaging condition. Specifically, the imaging controller 51 controls the imaging unit 18 to image the specimen S and thus to generate a specimen image, controls the monitor 55 to display the specimen image, and then controls the storage unit 58 to record the specimen image in the imaging information database 60. Here, the previously set imaging condition is a condition related with a time of exposure, gain, or the like, and is appropriately set and changed for each specimen S.

The operation information management unit 53 cooperates with the monitor 55 and the input device 56, and configures various graphical user interfaces (GUI). The GUI is, for example, a GUI for standing by for moving the imaging area in the specimen S in the XP plane, a GUI for giving a command to the imaging unit 18 to capture an image of the specimen S, a GUI for setting a current area position as the time lapse imaging position, and a GUI for standing by for a command for moving an imaging area to the Z direction perpendicular to the XY plane, i.e., to the direction of an imaging optical axis of the imaging unit 18, for focus adjustment.

The microscope controller 52 controls the stage driver 41 and the electromotive stage 12 based on a command input from the input device 56 via the GUI displayed on the monitor 55 by the operation information management unit 53. The microscope controller 52 moves the imaging area in an XY plane by a predetermined amount in a stepwise manner, and moves the imaging area in a Z direction, for example. An amount of movement of one step is set, so that imaging areas of the imaging unit 18 before and after the stepwise moving of the specimen S are adjacent to each other, in other words, so that the specimen image generated before the stepwise moving is located next to the specimen image generated after the stepwise moving. The microscope controller 52 records the coordinates of the area position at the time in the imaging information database 60.

The electromotive stage 12 has a mechanical origin for each of the X, Y, and Z directions. The microscope controller 52 internally manages an amount of movement instructed to the stage driver 41 based on the mechanical origins. Hence, the microscope controller 52 can recognize a current positional coordinates of the electromotive stage 12. In other words, the microscope controller 52 has a function of detecting the position of the electromotive stage 12 relative to the optical axis of the objective lens 13, and outputs the current positional coordinates (X, Y, Z) of the electromotive stage 12 as a current position of the imaging area. As an alternative structure, a separate position detector may be provided for detecting the current position of the electromotive stage 12. Then, the position detector may directly recognize the positional coordinates of the electromotive stage 12.

Figure 2:
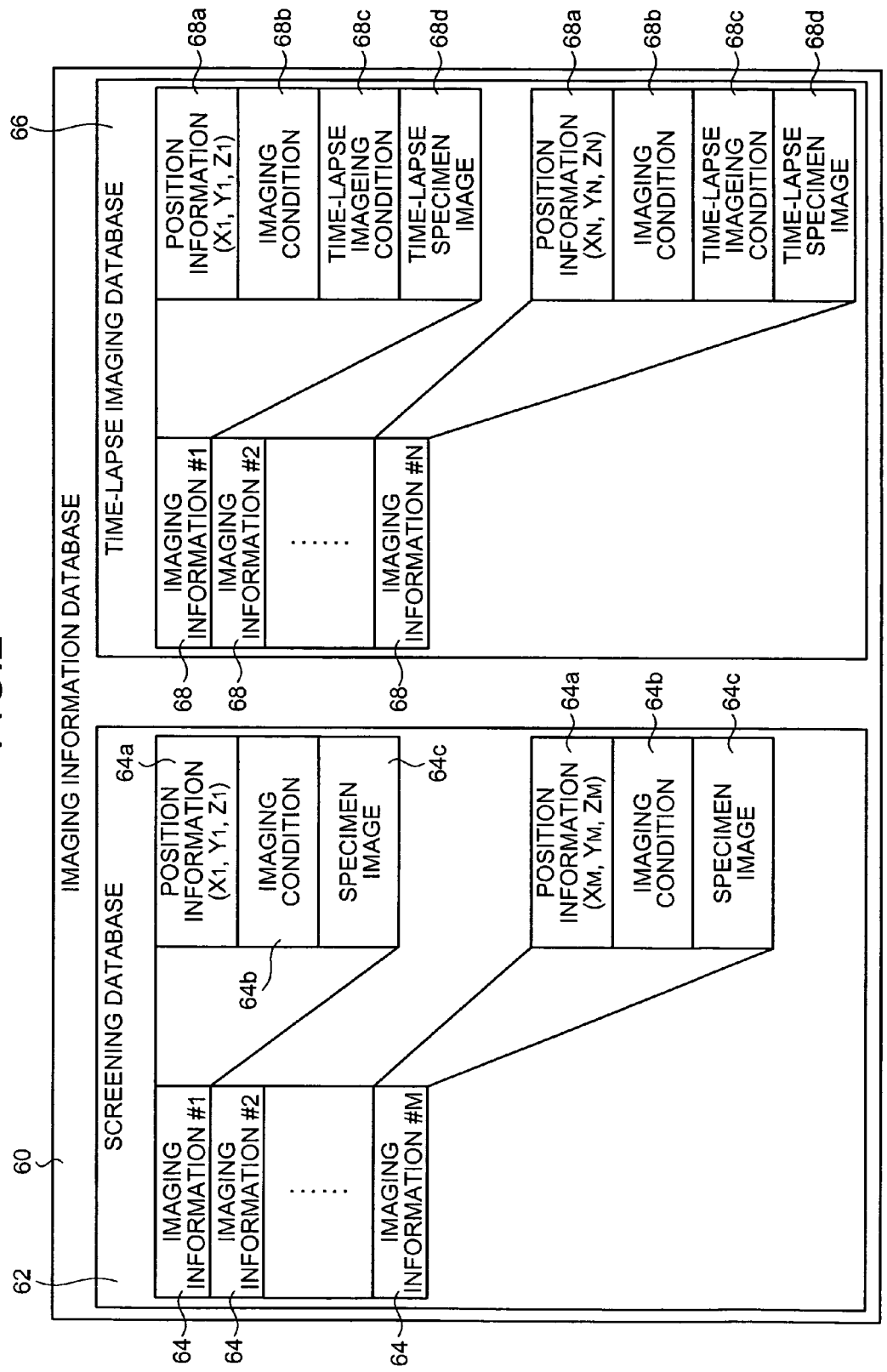
FIG. 2 schematically shows a data structure of an imaging information database in accordance with the first embodiment.

FIG. 2 schematically shows a data structure of the imaging information database 60. As shown in FIG. 2, the imaging information database 60 includes a screening database 62 and a time-lapse imaging database 66.

The screening database 62 includes pieces of imaging information 64 each of which consists of, for example, position information 64a indicating an area position, imaging condition 64b, and specimen image 64c. The time-lapse imaging database 66 includes pieces of imaging information 68 each of which consists of, for example, position information 68a indicating an area position of an imaging area set as the time-lapse imaging target, imaging condition 68b, time-lapse imaging condition 68c such as time interval and the number of images to be captured, and time-lapse specimen image 68d. Here, the time-lapse specimen image 68d is a specimen image generated by the imaging unit 18 through time-lapse imaging of an imaging area corresponding to the position information 68a.

The position information 64a and the position information 68a indicate coordinates in the XYZ coordinates system which consists of the XY coordinates of a position in the XY plane and the Z coordinate of a position in the Z direction.

A screening procedure which is carried out in the observation apparatus according to the first embodiment will be described below with reference to the flowchart of FIGS. 3A and 3B.

First, the microscope controller 52 controls the stage driver 42 and the electromotive stage 12 to move the imaging area of the imaging unit 18 to a predetermined position (step S1), and records the XYZ coordinates of the area position of the current imaging area in the screening database 62 (step s2). Subsequently, the microscope controller 52 controls the illumination controller 43 to turn on the incident-light illumination light source 22 or the transmitting illumination light source 31 (step S2). The imaging controller 51 controls the imaging unit 18 to image the specimen S through the objective lens 13 and thus to generate a specimen image (still image), and records the specimen image together with the imaging condition in the screening database 62 (step S2). The microscope controller 52 then controls the illumination controller 43 to turn off the incident-light illumination light source 22 or the transmitting illumination light source 31 (step S2). The imaging controller 51 also displays a map window 70 showing an array of the imaging area in the XY plane and an image display window 80 displaying the specimen image on the screen of the monitor 55.

In the map window 70, a section display image which shows an array of the imaging area in the specimen S is displayed. The section display image has a plurality of sections which are arrayed in matrix. The sections each correspond to sections into which the specimen S is divided by the amount of movement of the electromotive stage 12 per step in X and Y directions. One of the sections in the section display image corresponds to the imaging area of the specimen image generated by the imaging unit 18. In other words, tiled sections, each corresponding to the specimen image generated by the imaging unit 18, are arranged in the map window 70.

Of these sections, the current section of the imaging area arranged within the imaging range of the imaging unit 18 is highlighted by a bold line frame 71 (step S2). The coordinates of the area position of the current imaging are recorded in the screening database 62 by the microscope controller 52. Here, the coordinates of a point within the section corresponding to the area position, for example, the upper left corner of the section is used as the coordinates of the area position.

In the image display window 80, the specimen image generated by the imaging unit 18 is displayed as an observation image of the specimen S on the electromotive stage 12 (step S2). A reimaging (Re-Still) button 81 for giving a command for imaging the specimen S to the imaging unit 18 and a setting (Set) button 82 for setting the imaging area corresponding to the specimen image currently displayed as the time-lapse imaging target are displayed in the image display window 80.

Figure 5:
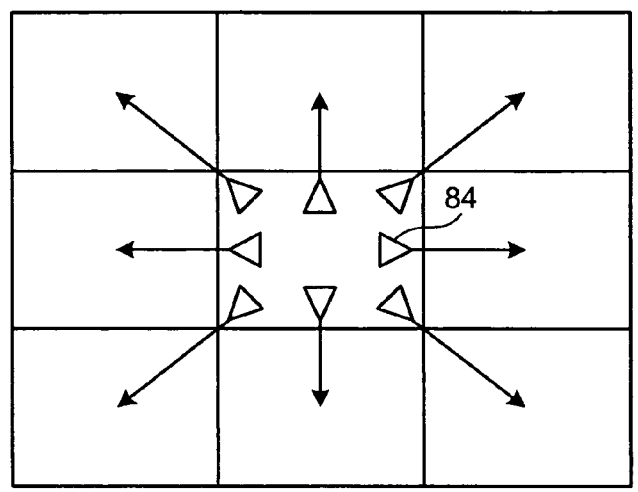
FIG. 5 shows a correspondence between an 8-direction move button displayed on an image display window of FIG. 4 and eight sections adjacent to a section corresponding to the current imaging position.

The operation information management unit 53 superimposes an 8-direction move button 84 for determining movement direction onto the specimen image displayed in the image display window 80 (step S2). The 8-direction move button 84 is associated with eight sections adjacent to the section of the current imaging area as shown in FIG. 5. Clicking one direction button of the 8-direction move button 84 with a mouse (not shown) allows the user to specify a desired imaging area moving direction. The operation information management unit 53 determines at any time whether any one of the direction buttons of the 8-direction move button 84 is clicked with the mouse or not (step S5). When a direction button is clicked (step S5: Yes), the operation information management unit 53 gives the microscope controller 52 a command for moving the imaging area to the section corresponding to the clicked direction button. In response to the command, the microscope controller 52 controls the stage driver 41 to move the electromotive stage 12 in the horizontal direction, so that the imaging area is moved to the section corresponding to the clicked direction button (step S6).

After the imaging area is moved in the XY plane, the imaging information management unit 54 compares the XY coordinates of the area position of the current imaging area with the XY coordinates recorded in the screening database 62 to determine whether the XY coordinates of the current area position is recorded in the screening database 62 or not, in other words, whether the XY coordinates of the current area position match with any one of the XY coordinates recorded in the screening database 62 (step S7).

As a result of comparing, when the XY coordinates of the current area position does not match with any one of the XY coordinates recorded in the screening database 62 (step S7: No), the imaging information management unit 54 gives an imaging command to the imaging controller 51. In response to the command, the imaging controller 51 controls the imaging unit 18 to image the specimen S and thus to generate a specimen image, displays the specimen image in the image display window 80, and then records the specimen image together with the imaging condition in the screening database 62 (step S8). Further, the microscope controller 52 records the XYZ coordinates of the current area position in the screening database 62 (step S8). In other words, when a section that has not been imaged is newly imaged, imaging information 64 for the newly imaged section is added to the screening database 62. When imaging the specimen S, the microscope controller 52 can control the FS controller 45 to match the illumination range of the incident-light illumination optical system or the transmitting illumination optical system with the imaging range by the field shutter 24 or 32. Other process in step S8 is performed in the same way as that in step S2.

As a result of comparing, when the XY coordinates of the current area position match with any one of the XY coordinates recorded in the screening database 62 (step S7: Yes), the imaging information management unit 54 reads, from the screening database 62, the specimen image that has been imaged at the current area position, and redisplays the read specimen image in the image display window 80 (step S9). It should be noted that the specimen image that has been imaged is associated with the area position in the screening database 62 and therefore can be searched with the area position by the imaging information management unit 54.

In this way, when the imaging area reaches a section that has not been imaged, imaging is performed. A section that has been imaged is visually distinguished from a section that has not been imaged in the map window 70. For example, non-imaged sections are displayed in white and imaged sections are displayed in gray. This allows the user to recognize at a glance the imaging trajectory of sections that have been imaged in the specimen S. Such visual distinction is not limited to coloring, and may include pattern or other image sign.

The operation information management unit 53 compares the XY coordinates of the destination with the XY coordinates recorded in the screening database 62 before moving the electromotive stage 12. When the XY coordinates of the destination match with any one of the XY coordinates recorded in the screening database 62, the operation information management unit 53 notifies that both XY coordinates match on the monitor 55.

The operation information management unit 53 can notify of matching of the eight sections, adjacent to the section of the current imaging position, being destination candidate in advance. Specifically, the operation information management unit 53 compares the XY coordinates of the adjacent eight sections being destination candidate with the XY coordinates recorded in the screening database 62, the direction button of the 8-direction move button 84 corresponding to the section that is not matched with any one of the XY coordinates recorded in the screening database 62 is displayed in, for example, white, and the direction button of the 8-direction move button 84 corresponding to the section that is matched with any one of the XY coordinates recorded in the screening database 62 is displayed in, for example, gray (step S10). This allows the user to recognize at a glance which section of the eight sections adjacent to the section of the current position has been imaged or not. The representation for distinguishing between imaged section and non-imaged section is not limited to colored button, and may include, for example, different pattern or brightness.

Figure 4:
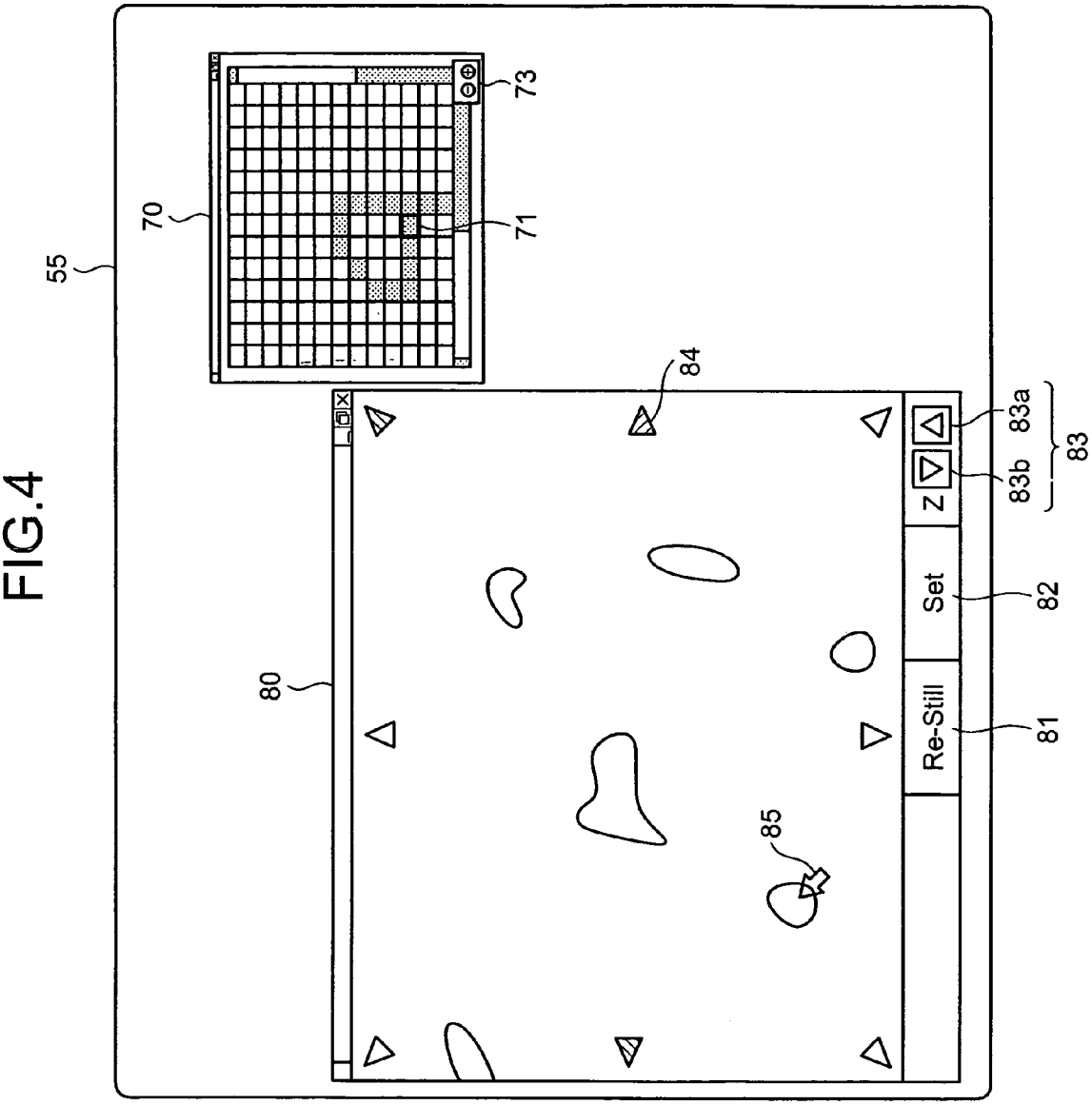
FIG. 4 shows a display screen on a monitor shown in FIG. 1.
Figure 6:
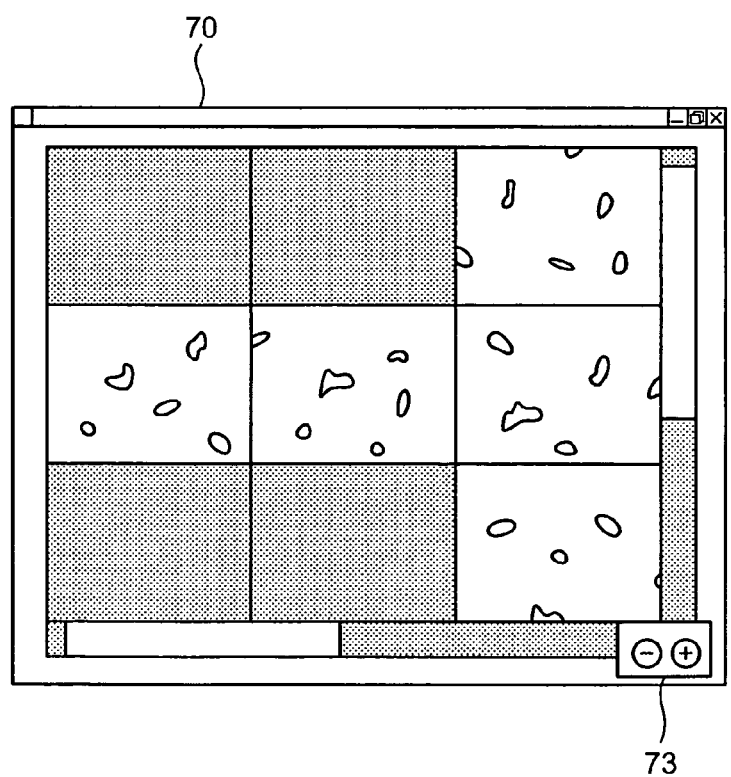
FIG. 6 shows an enlarged display of a map window shown in FIG. 4.

In the map window 70, a scaling button 73 for enlarging/decreasing the section display image displayed therein is displayed. FIG. 4 shows a decreased section display image. When an enlargement button is clicked, the imaging information management unit 54 compares the XY coordinates of area positions associated with the eight sections (upper, lower, left, right, upper right, lower right, upper left, lower left) adjacent to the section of the current imaging area with each piece of the position information 64a in the screening database 62. The specimen image of the section the XY coordinates of which match with the XY coordinates in the screening database 62 is read, the read specimen image is arrayed with the specimen image corresponding to the section of the current imaging area as shown in FIG. 6. The section the XY coordinates of which does not match with the XY coordinates in the screening database 62 is displayed in gray.

In other words, the specimen images recorded in the screening database 62 are displayed in the imaged section in an enlarged map window 70.

On the other hand, the control unit 50 determines at any time whether the setting (Set) button 82 in the image display window 80 is clicked or not (step S3). When the setting button 82 is clicked (step S3: Yes), the control unit 50 adds a piece of imaging information 68 to the time-lapse imaging database 66; the microscope controller 52 records the XYZ coordinates of the area position of the current imaging area as position information 68 of the added piece of imaging information 68 in the time-lapse imaging database 66; and the imaging controller 51 records the imaging condition corresponding to the displayed specimen image as an imaging condition 68*b* of the added piece of imaging information 68 in the time-lapse imaging database 66 (step S4).

The moving operation and the setting operation as described above are combined and performed by the user as necessary. When the setting button 82 is clicked, the section of the corresponding imaging area is set as the time-lapse imaging target. When all the desired imaging areas are finally set as the time-lapse imaging target, the screening procedure is completed. Specifically, the sequential procedure as shown in FIGS. 3A and 3B is completed by inputting a command for process completion.

At the time the screening procedure is completed, the time-lapse imaging condition 68*c* and the time-lapse specimen image 68*d* of the imaging information 68 in the time-lapse imaging database 66 are set to no data. The time-lapse imaging condition 68*c* is added to the time-lapse imaging database 66 by the user through a screen displayed on the monitor 55 for setting parameters such as time-lapse imaging interval and the numbers of images to be captured, when the control unit 50 executes a program for time-lapse imaging. The time-lapse specimen image 68*d* is added when the time-lapse imaging is performed.

When the program for time-lapse imaging is executed, the imaging controller 51 performs time-lapse imaging under the time-lapse condition 68*c* (imaging interval and the number of images to be captured) of the imaging information 68 in the time-lapse imaging database 66. At this time, the microscope controller 52 determines the position of the imaging area of the imaging unit 18 based on the position information 68*a*. The imaging controller 51 also controls the imaging unit 18 to image the specimen S and thus to generate a specimen image, and records the specimen image as the time-lapse specimen image 68*d* in the time-lapse imaging database 66.

According to the observation apparatus of the first embodiment, the user performs the screening while looking at the still image, and the specimen S is illuminated only during the imaging. Therefore, the time the specimen S is illuminated is extremely short compared with the time the specimen S is illuminated when the user performs the screening while looking at the live image. Thus, the illumination-induced discoloration and the damage of the specimen can be well suppressed.

Figure 7A:
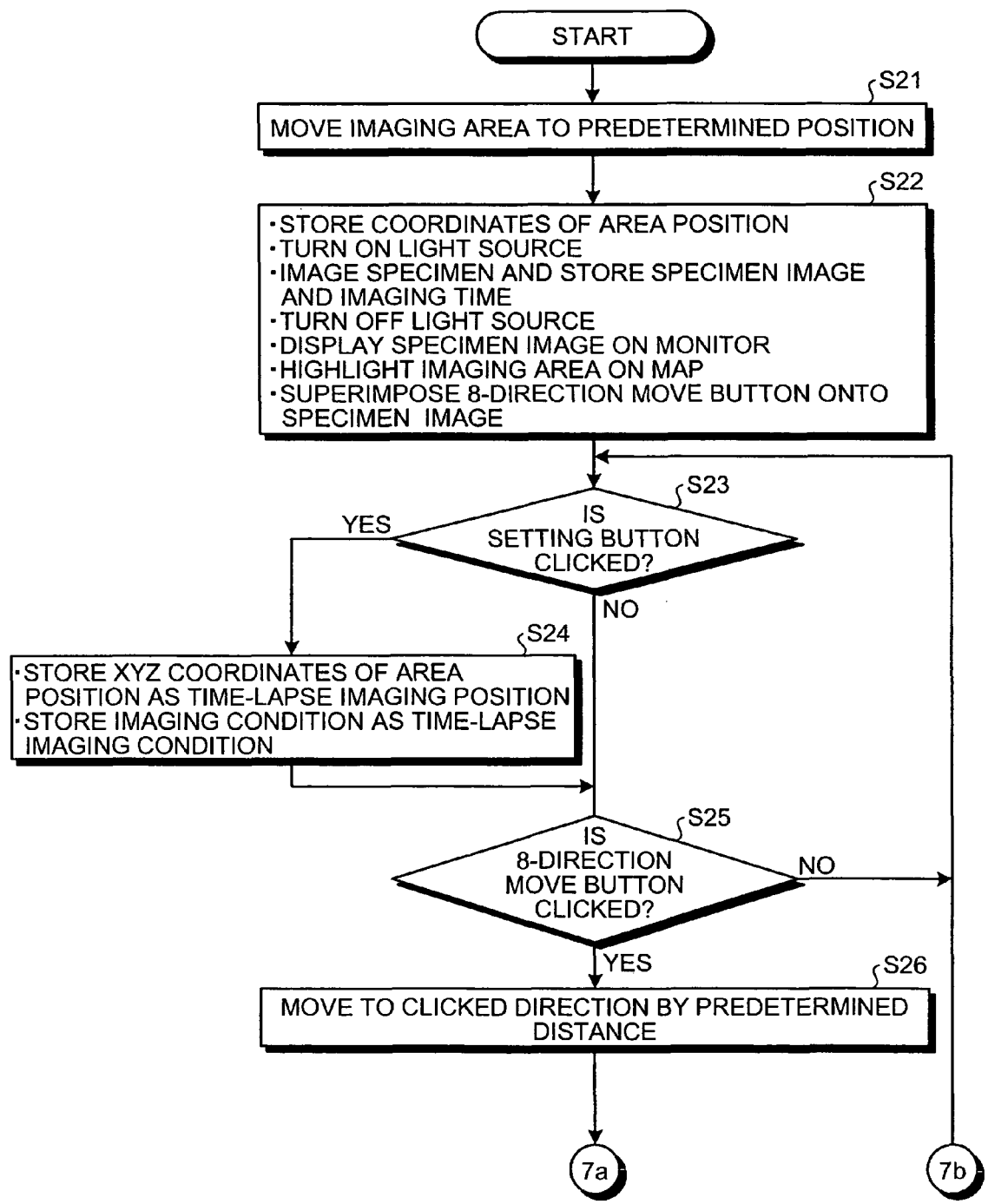
FIGS. 7A and 7B show a flowchart of screening procedure in accordance with a second embodiment of the present invention.
Figure 7B:
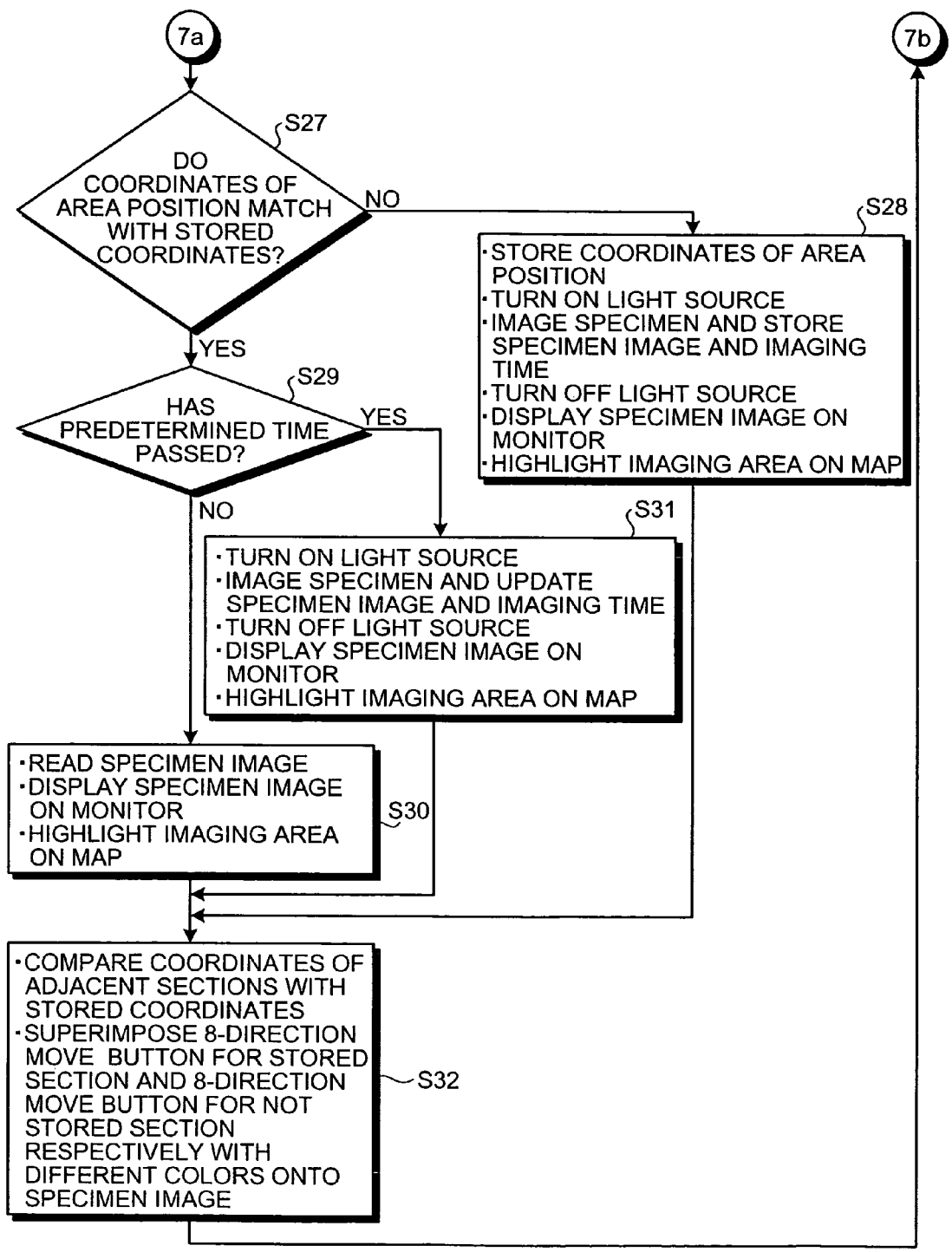

FIGS. 7A and 7B show a flowchart of screening procedure in accordance with a second embodiment of the present invention. The second embodiment differs from the first embodiment in the following. According to the first embodiment, when the imaging area reaches a section that has been imaged, the specimen image that is recorded corresponding to the section is displayed unconditionally. The second embodiment displays a newly imaged specimen image not the specimen image that has been imaged, if a predetermined time has passed since the imaging time of the recorded specimen image when the imaging area reaches a section that has been imaged.

Figure 8:
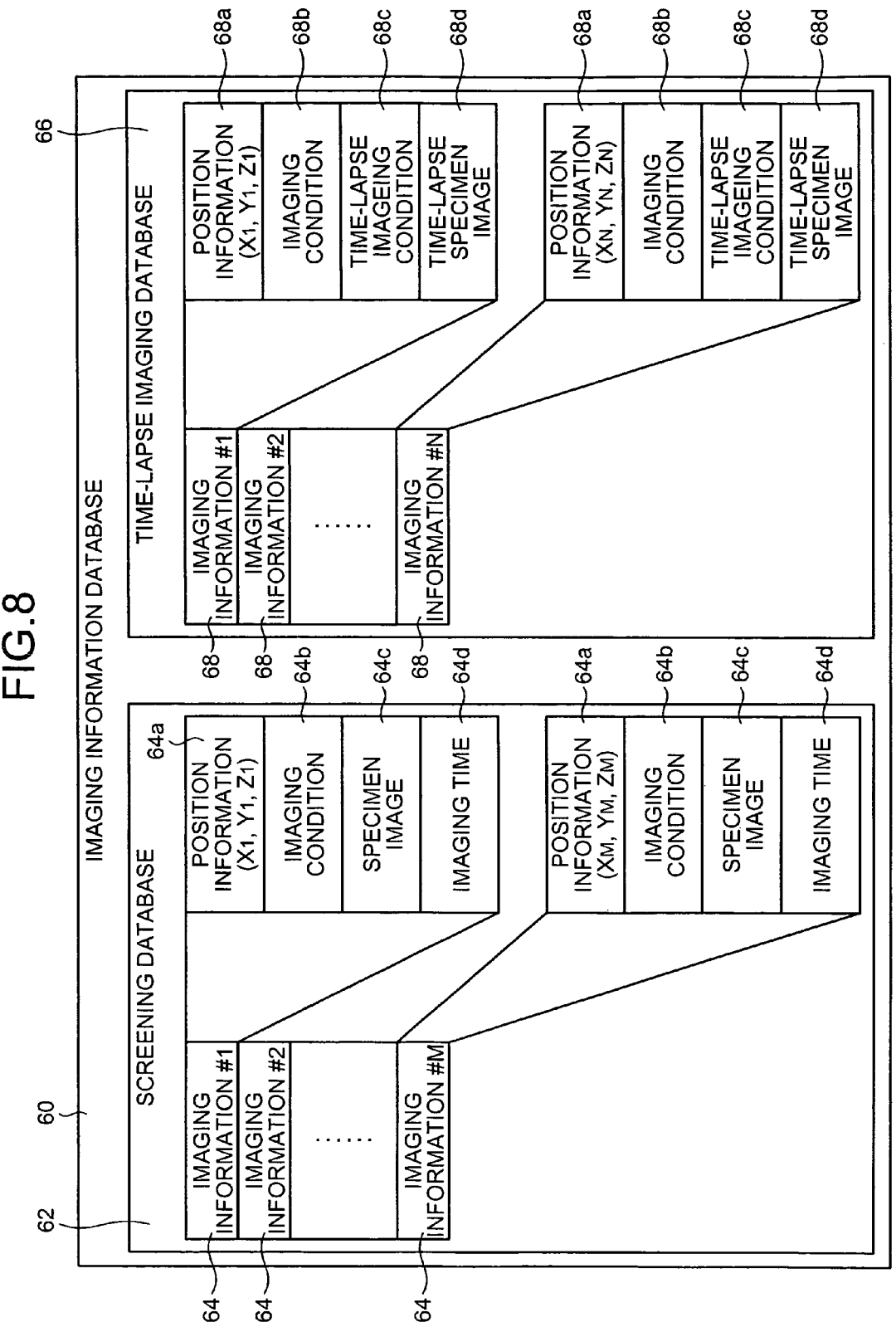
FIG. 8 schematically shows a data structure of an imaging information database in accordance with the second embodiment.

In the observation apparatus of the second embodiment, the storage unit 58 can store imaging time; as shown in FIG. 8, the imaging information 64 in the screening database 62 includes imaging time 64*d* in addition to the position information 64*a*, the imaging condition 64*b*, and the specimen image 64*c*. The imaging controller 51 records the imaging time together with the specimen image and the imaging condition in the screening database 62 when the imaging is performed.

The imaging information management unit 54 compares the XY coordinates of area position of the current imaging area with the XY coordinates recorded in the screening database 62 to determine whether the XY coordinates of the current area position is recorded in the screening database 62 or not, in other words, whether the XY coordinates of the current area position match with any one of the XY coordinates recorded in the screening database 62 (step S27). As a result of matching, when the XY coordinates of the current area position match with any one of the XY coordinates recorded in the screening database 62 (step S27: Yes), the current time is compared with the imaging time of the specimen image that has been imaged at the current area position to determine whether a predetermined time has passed since the imaging time or not (step S29).

As a result of comparing, when the deference between the current time and the imaging time, in other words, a time between the recorded imaging time and the current time is not more than a predetermined time (step S29: No), the imaging information management unit 54 reads, from the screening database 62, the specimen image that has been imaged at the current area position, and redisplays the read specimen image in the image display window 80 (step S30). As a result of comparing, when the deference between the current time and the imaging time is more than the predetermined time (step S29: Yes), the imaging information management unit 54 gives an imaging command to the imaging controller 51. In response to the command, the imaging controller 51 controls the imaging unit 18 to image the specimen S and thus to generate a specimen image, displays the specimen image in the image display window 80, and updates the specimen image and the imaging condition in the screening database 62 (step S31). The imaging controller 51 records the current time, and updates the imaging data to the current time in the screening database 62 (step S31). Other process in step S31 is performed in the same way as that in step S8.

Figure 3A:
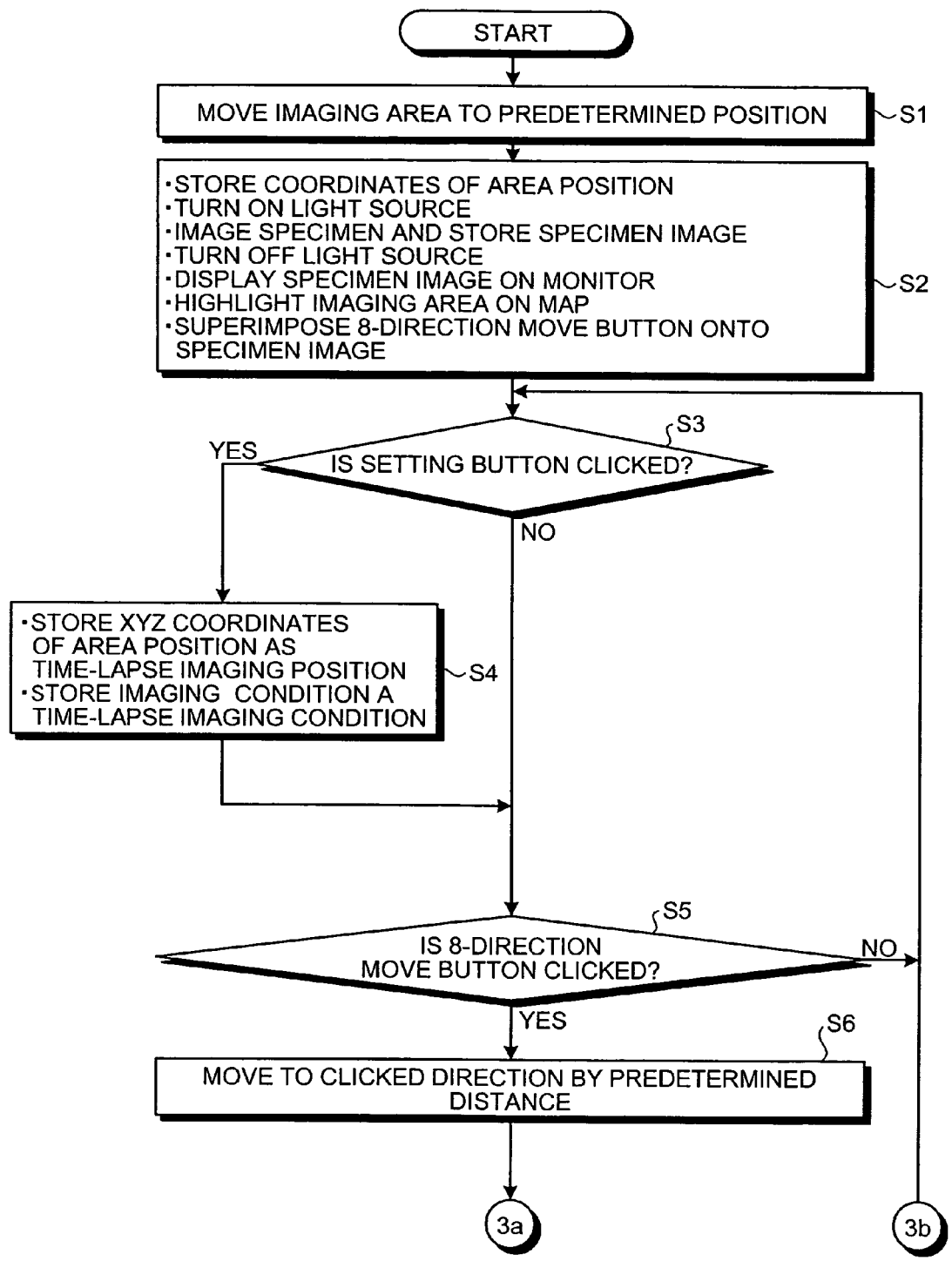
FIGS. 3A and 3B show a flowchart of screening procedure in accordance with the first embodiment.
Figure 3B:
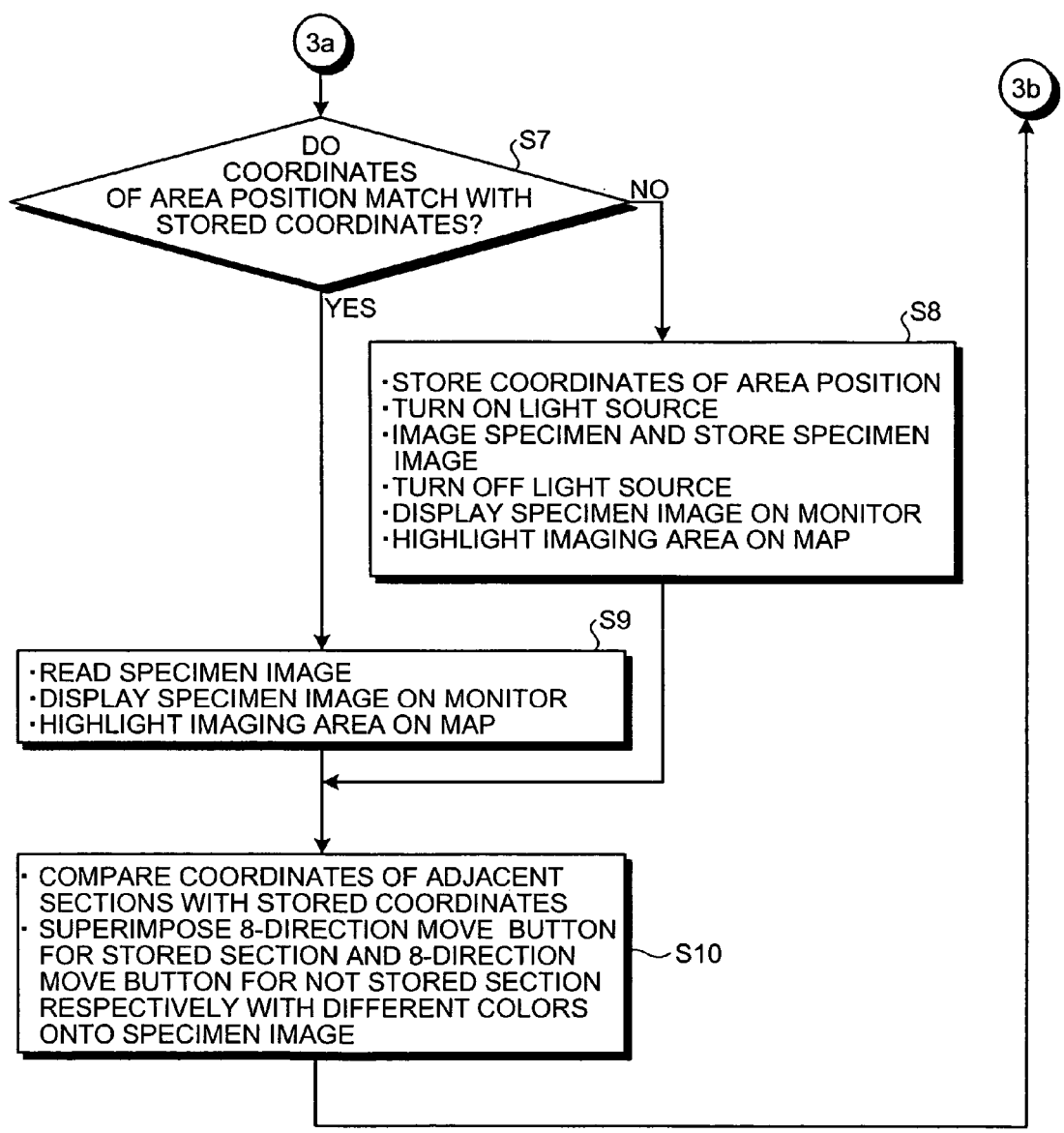

Other process shown in FIGS. 7A and 7B is performed in the same way as that shown in FIGS. 3A and 3B. Specifically, steps S21 to S26 correspond respectively to steps S1 to S6, and steps S28 and S32 correspond respectively to steps S8 to S10. Here, in steps S22 and S28, the imaging controller 51 not only performs the process of steps S2 and S8 but also updates the imaging time to the current time in the screening database 62.

As described above, if a predetermined time has passed since the imaging time of the recorded specimen image when the imaging area reaches a section that has been imaged, a newly imaged specimen image not the specimen image that has been imaged, a specimen image is newly imaged unconditionally. Alternatively, the operation information management unit 53 may display a message window 86 for reimaging a specimen image, and redisplay the recorded specimen image or image a specimen image again in response to the message window 86. The message window 86 may be displayed at the time the imaging area reaches a section that has been imaged.

Figure 10A:
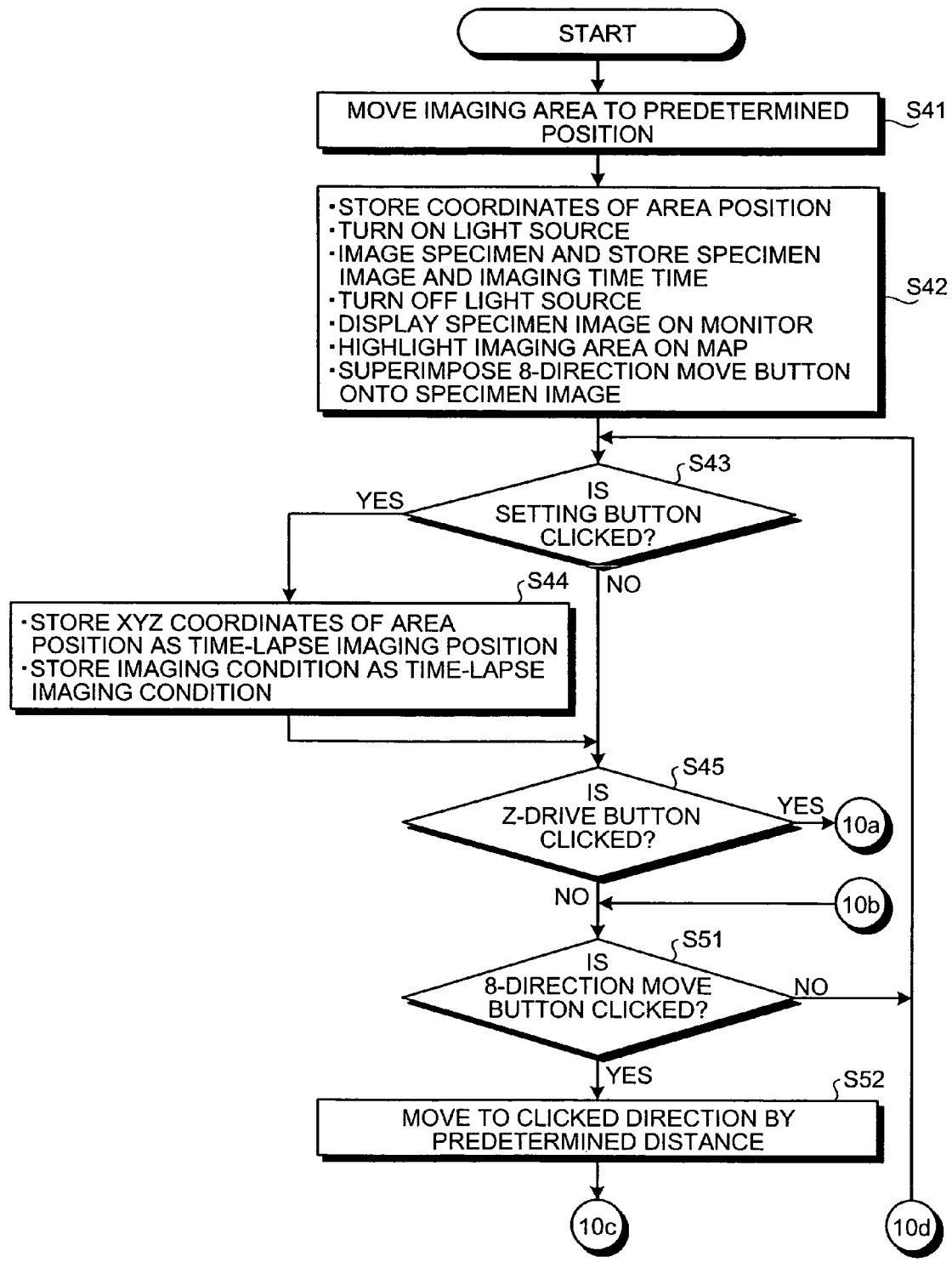
FIGS. 10A to 10C show a flowchart of screening procedure in accordance with a third embodiment of the present invention.
Figure 10B:
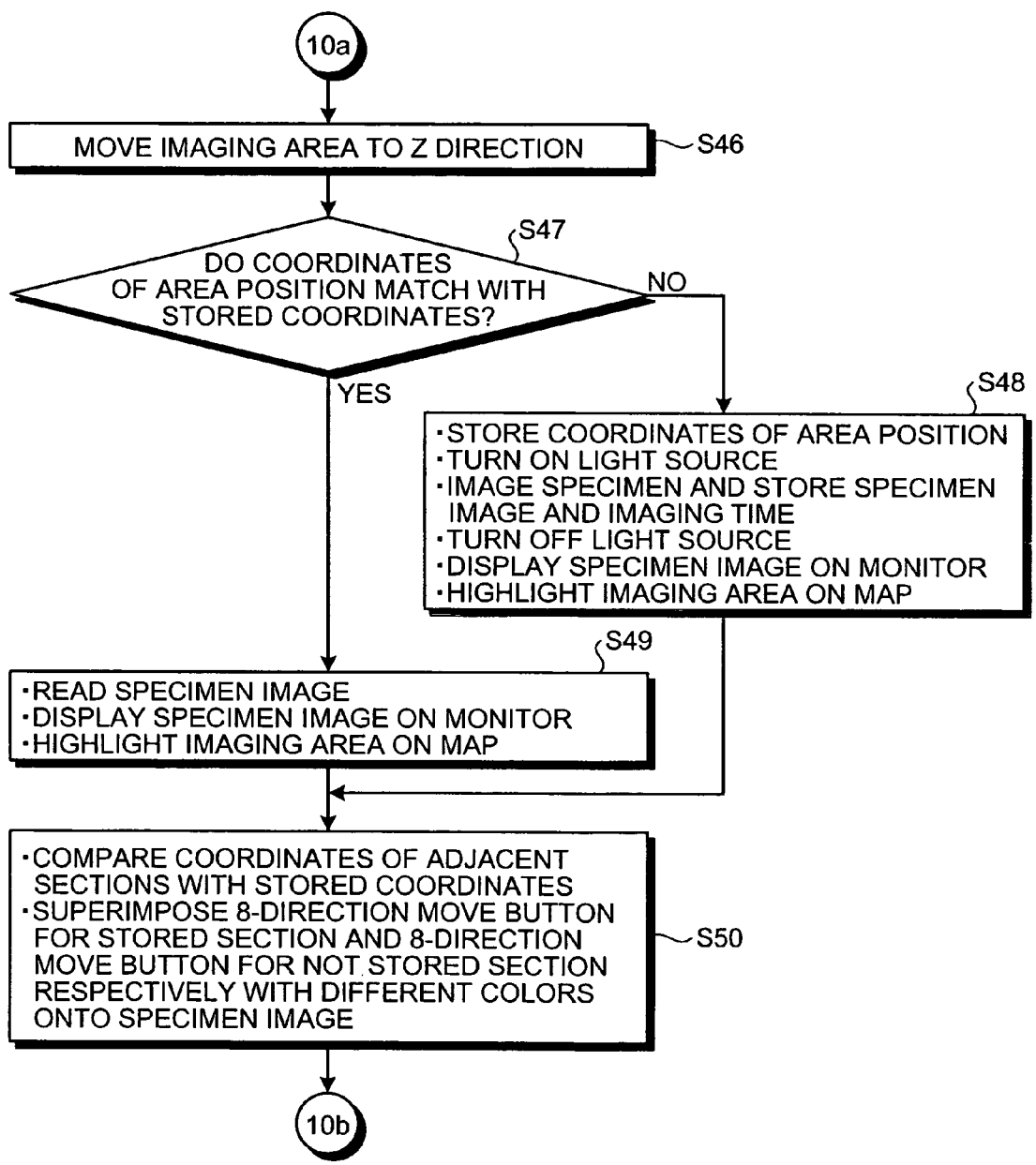
Figure 10C:
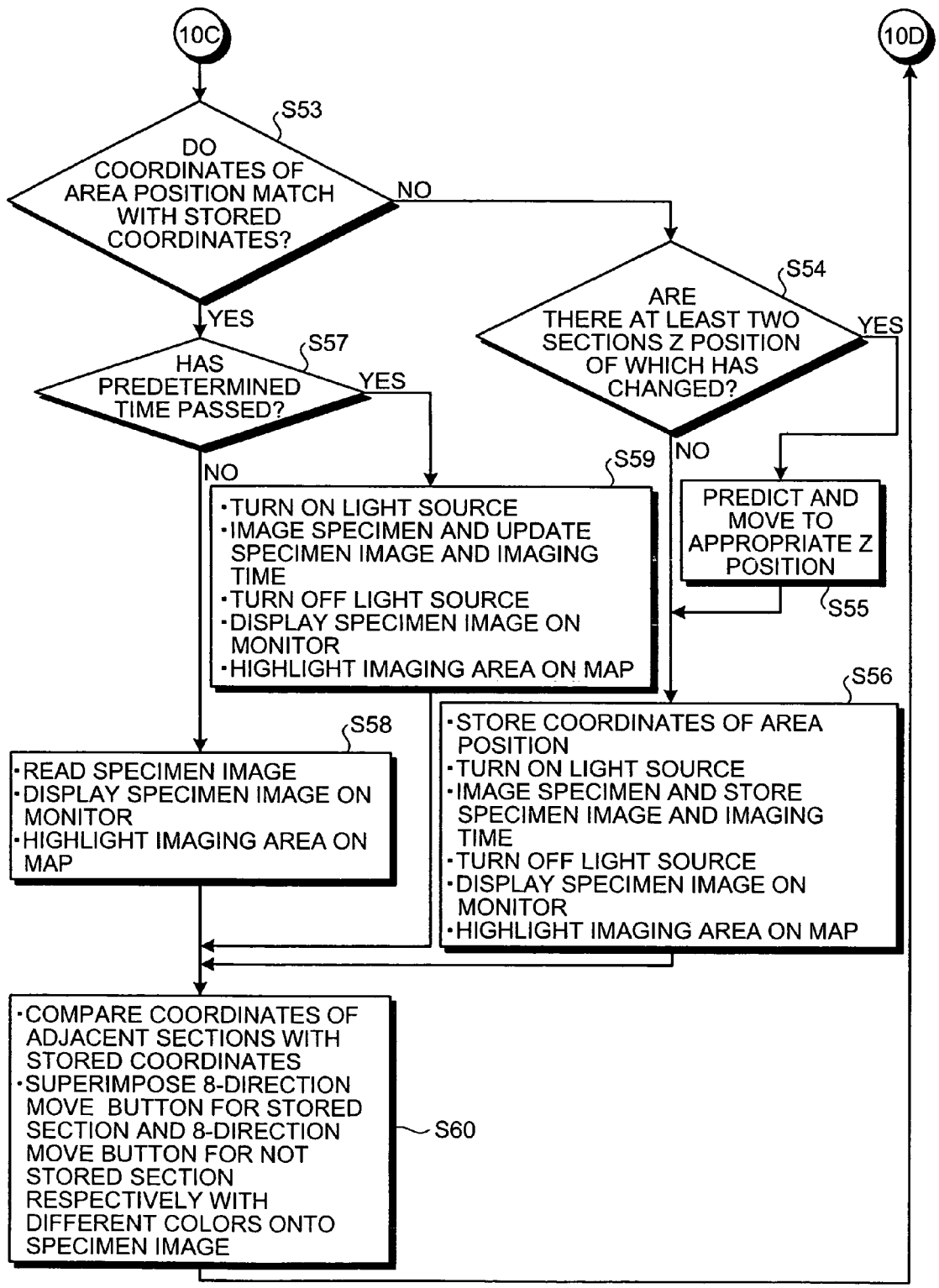

FIGS. 10A to 10C are a flowchart of screening procedure in accordance with a third embodiment of the present invention. The third embodiment differs from the second embodiment in that the Z position is automatically corrected before imaging the specimen S when the imaging area reaches a section that has not been imaged.

Figure 11:
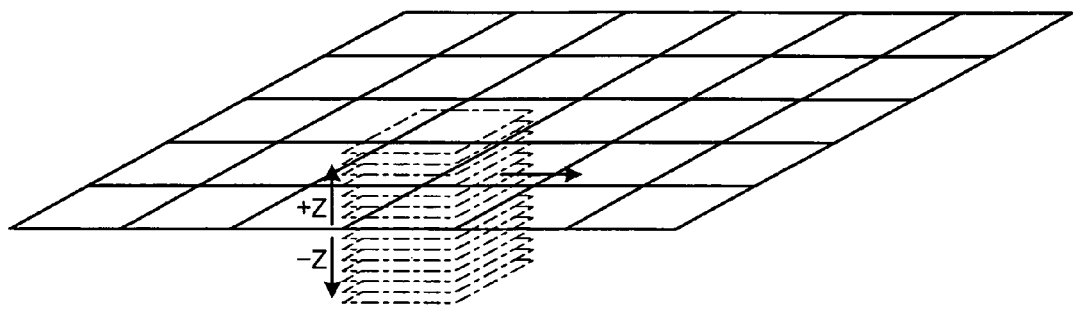
FIG. 11 schematically illustrates Z direction movement and horizontal movement of imaging position with a z drive button and the 8-direction move button.

As shown in FIG. 4, a Z drive button 83 for giving a command for moving the electromotive stage 12 up and down to adjust focus is displayed in the image display window 80. When an up button 83a or a down button 83b of the Z drive button 83 is clicked, the electromotive stage 12 is moved up or down according to the clicked button so that the imaging area is moved to +Z direction or −Z direction at a predetermined pitch, as shown in FIG. 11. In other words, the operation information management unit 53, the monitor 55, and the input device 56 provides a GUI for standing by for a command for moving the imaging area to the Z direction perpendicular to the XY plane for focus adjustment; the microscope controller 52 controls the stage driver 41 to move the electromotive stage 12 according to the command input from the input device 56 through the GUI so that the imaging area is moved to the Z direction.

The operation information management unit 53 determines at any time whether the Z drive button 83 is clicked (step S45). When the Z drive button 83 is clicked (step S45: Yes), the operation information management unit 53 gives the microscope controller 52 a commend for moving the imaging area according to the clicked button (the up button 83a or the down button 83b). In response to the command, the microscope controller 52 moves the imaging area to the Z direction (step S46). When the imaging area is moved to the Z direction, the imaging information management unit 54 compares the XYZ coordinates of the area position of the current imaging area with the XYZ coordinates recorded in the screening database 62 (step S47).

As a result of comparing, when the XYZ coordinates of the current area position does not match with any one of the XYZ coordinates recorded in the screening database 62 (step S47: No), the imaging information management unit 54 gives an imaging command to the imaging controller 51. In response to the command, the imaging controller 51 controls the imaging unit 18 to image the specimen S and thus to generate a specimen image, records the current time as the imaging time, displays the specimen image in the image display window 80, and then records the specimen image together with the imaging condition and the imaging time in the screening database 62 (step S48). Further, the microscope controller 52 records the XYZ coordinates of the current area position in the screening database 62. Other process in step S48 is performed in the same way as that in step S28.

As a result of comparing, when the XYZ coordinates of the current area position match with any one of the XYZ coordinates recorded in the screening database 62 (step S47: Yes), the imaging information management unit 54 reads, from the screening database 62, the specimen image that has been imaged at the current area position, and redisplays the read specimen image in the image display window 80 (step S49). Step S50 after steps S48 and S49 is performed in the same way as steps S10 and S32.

Figure 12:
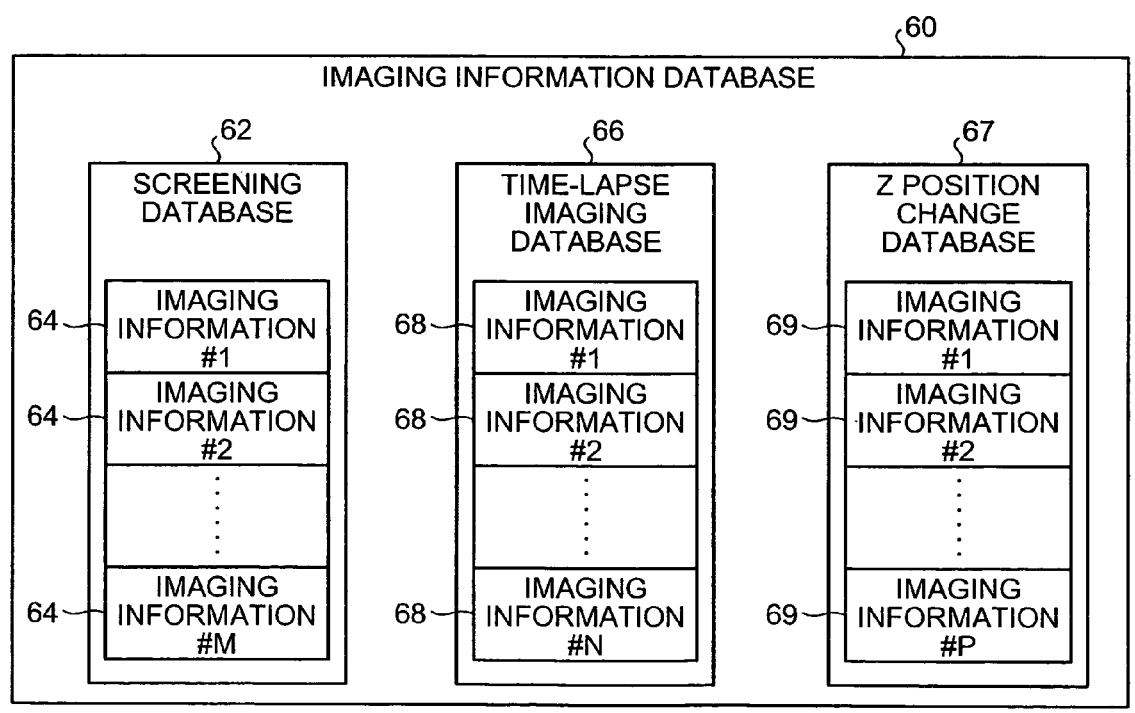
FIG. 12 schematically shows a data structure of an imaging information database in accordance with the third embodiment.

In the third embodiment, when the imaging area is moved to a section of other XY coordinates by clicking the 8-direction move button 84 after moving to the Z direction, the image at the Z position after moving in the Z direction is normally in the best focus. As shown in FIG. 12, the imaging information management unit 54 records the XY coordinates at the time the Z position is changed and the Z coordinate out of the XY coordinates as position information 69 in a Z position change database 67 separated from the screening database 62 in the imaging information database 60. When the imaging area is moved in the XY plane (step S52), the imaging information management unit 54 also compares the XY coordinate of the area position of the current imaging area with those recorded in the Z position change database 67 before comparing with the XY coordinates in the imaging information 64 recorded in the screening database 62 (step S53).

As a result of comparing, there is no XY coordinates in the Z position change database 67 that match with the XY coordinates of the current area position (step S53: No), the imaging information management unit 54 determines whether the number of sections the Z position of which is changed is not less than two (step S54). The number of sections can be readily obtained by counting the peaces of position information 68 in the Z position change database 67. When the number of sections the Z position of which is changed is not less than two (step S54: Yes), the imaging information management unit 54 predicts a preferred Z position from the XY coordinates of the destination section based on the XYZ coordinates of the first section and the XYZ coordinates of at least two sections the Z position of which is changed; the microscope controller 52 controls the stage driver 41 to move the electromotive stage 12 so that the imaging area is moved to the preferred Z position (step S55). The preferred Z position can be predicted by, for example, deriving a plane equation with the minimum difference between the XYZ coordinates of the first section and the XYZ coordinates of at least two sections the Z position of which is changed and by substituting the XY coordinates of the destination section for the plane equation. In step S56, the same process as that of step S48 is then performed.

Other process shown in FIGS. 10A to 10C is performed in the same way as that shown in FIGS. 7A and 7B. Specifically, steps S41 to S44 and S51 correspond respectively to steps S21 to S24 and S25, and steps S57 to S60 correspond respectively to steps S29 to S32.

In the third embodiment, since the Z position is automatically corrected prior to imaging when the imaging area is moved in the XY plane, the possibility that the specimen image is generated in focus immediately after the imaging area is moved in the XY plane is increased. This reduces the number of Z direction movements for focus adjustment as described in the second embodiment, and therefore reduces the number of illuminations of the specimen S.

In the third embodiment, the Z position of the imaging area being the destination is automatically corrected when there are at least two sections the Z position of which is changed. Alternatively, the Z position of the imaging area being the destination may be automatically corrected based on the XYZ coordinates of three points that are obtained in advance.

Referring to FIG. 4, when the input device 56 is operated in a specific manner, for example, double-clicking of the mouse, with a position in the specimen image displayed in the image display window 80 being specified, the operation information management unit 53 obtains the XY coordinates of the position of a mouse pointer 85.

Figure 13:
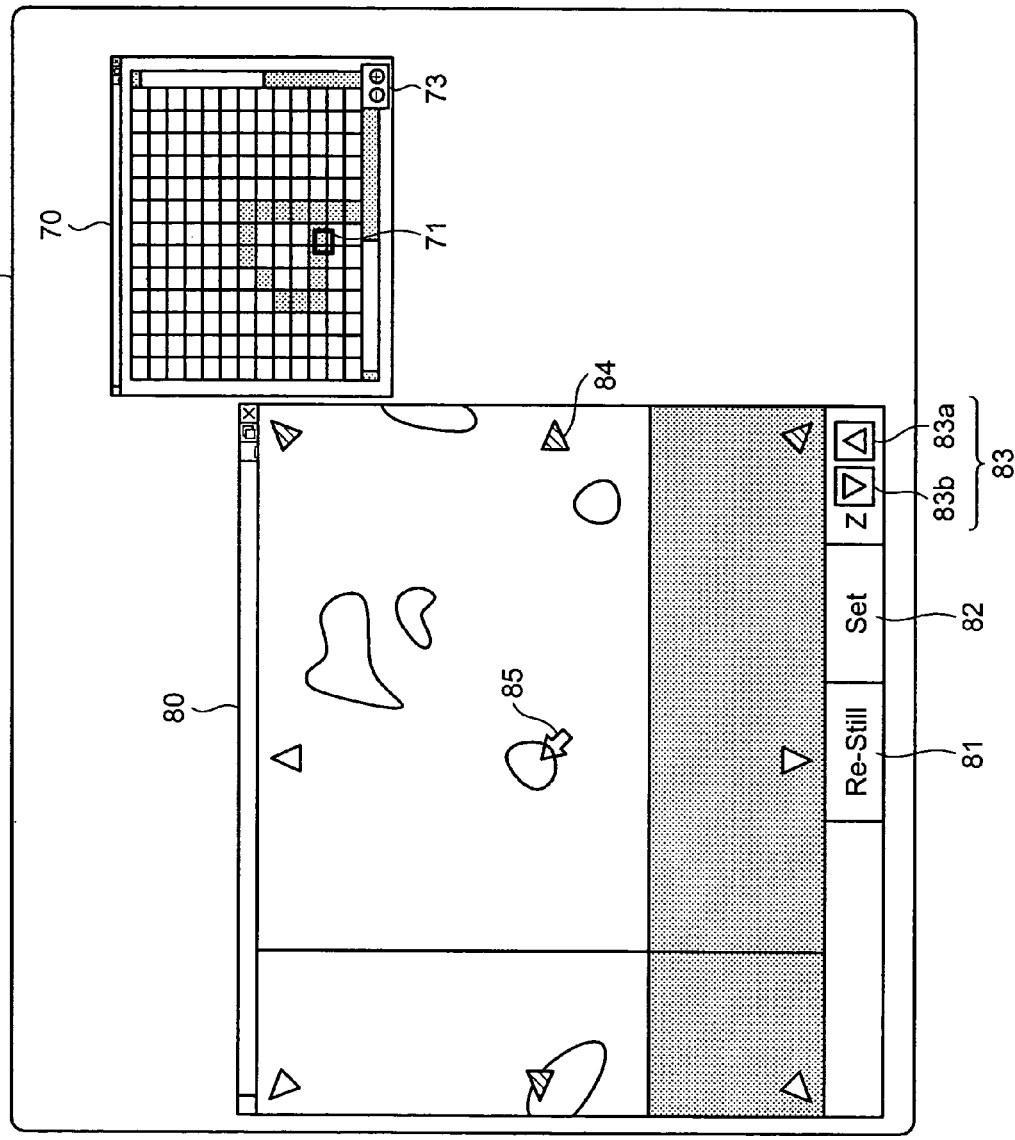
FIG. 13 shows a display of a specific position on a specimen image at the center of the image display window.

As shown in FIG. 13, the imaging information management unit 54 displays a rearranged specimen image so that the XY coordinates obtained by the operation information management unit 53 are at the center of the image display window 80. The redisplayed specimen image is generated by arraying a specimen image of the centered section and some sections adjacent to the specimen image which are read from the screening database 62 by the imaging information management unit 54. The non-imaged sections are displayed in a specific color such as gray because of no specimen image.

The imaging information management unit 54 changes the display position of the bold line frame 71 so that the center of the bold line frame 71 is at the XY coordinates obtained by the operation information management unit 53 in the map window 70.

When the setting button 82 in the image display window 80 is clicked, the operation information management unit 53 calculates the XY coordinates of the area position of the imaging area corresponding to the bold line frame 71 in the map window 70, and records the calculated XY coordinates in the time-lapse imaging database 66. The microscope controller 52 records the Z coordinate of the area position of the imaging area at the center of the image display window 80 in the time-lapse imaging database 66; the imaging controller 51 records the imaging condition of the area position of the imaging area at the center of the image display window 80 in the time-lapse imaging database 66. Hence, the position information 68a and imaging condition 68b of one peace of imaging information 68 are added to the time-lapse imaging database 66.

As described above, when the program for time-lapse imaging is executed, the microscope controller 52 determines a position of the imaging area of the imaging unit 18 based on the position information 68a in the time-lapse imaging database 66; the imaging controller 51 time-lapse images the imaging area. Therefore, the imaging controller 51 performs the time-lapse imaging with the position of the mouse pointer 85 being set as the center of the specimen image displayed in the image display window 80.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An observation apparatus comprising:
    an illumination unit that illuminates a specimen;
    an imaging unit that images an imaging area of the specimen to generate an observation image;
    a moving unit that moves the specimen with respect to the imaging unit;
    an information obtaining unit that obtains position specifying information for specifying an area position of the imaging area with respect to the imaging unit;
    a storage unit that stores the observation image and the area position in association with each other;
    a movement controller that controls the moving unit to move the specimen so that a new area position specified by a new position specifying information item obtained by the information obtaining unit is within an imaging range of the imaging unit;
    a matching unit that, when the new area position is within the imaging range, compares the new area position with the area position stored in the storage unit to determine whether the new area position is already stored in the storage unit;
    an imaging controller that, when the new area position is not yet stored in the storage unit, controls the imaging unit to image a new imaging area corresponding to the new area position to generate a new observation image, and stores the new observation image in the storage unit as the observation image stored in the storage unit;
    a position storing controller that, when the imaging controller stores the new observation image in the storage unit, stores the new area position in the storage unit as the area position stored in the storage unit; and
    an illumination controller that controls the illumination unit to illuminate the specimen only during an imaging period when the imaging unit images the imaging area.

2. The observation apparatus according to claim 1, wherein the illumination unit includes a field shutter that restricts an illumination area on the specimen, and the illumination controller coincides the illumination area of the illumination unit with the imaging range of the imaging unit using the field shutter.

3. The observation apparatus according to claim 1, further comprising:
    a display unit that displays the observation image; and
    a redisplay controller that, when the matching unit determines that the new area position is already stored in the storage unit, controls the display unit to display the observation image associated with the new area position and already stored in the storage unit,
    wherein the imaging controller controls the display unit to display the observation image, when the imaging unit generates the observation image.

4. The observation apparatus according to claim 3, wherein:
    the moving unit moves the specimen in a first direction by a first step at a time and in a second direction by a second step at a time based on the new position specifying information, the first direction and the second direction being in a plane perpendicular to an imaging optical axis of the imaging unit, and
    the imaging controller controls the display unit to display a section display image showing an array of a specimen section in the specimen which is sectioned by the first step and the second step, and controls the display unit to display an image sign for notifying that the observation image is generated in a display section of the section display image corresponding to the imaging area, when the imaging unit generates the observation image.

5. The observation apparatus according to claim 4, wherein:
    the first step is an amount of movement that the imaging areas before and after the moving unit moves the specimen in the first direction are adjacent to each other, and
    the second step is an amount of movement that the imaging areas before and after the moving unit moves the specimen in the second direction are adjacent to each other.

6. The observation apparatus according to claim 4, wherein the imaging controller controls the display unit to display the image sign with at least one of a predetermined color and a predetermined pattern.

7. The observation apparatus according to claim 4, wherein the imaging controller controls the display unit to highlight the display section moved to the imaging range at the area position.

8. The observation apparatus according to claim 4, further comprising an information display controller that, when the new area position is within the imaging range, compares the area position corresponding to at least one specimen section located around the new area position with the area position stored in the storage unit to determine whether the area position corresponding to the at least one of the specimen sections is stored in the storage unit, and controls the display unit to display notice information indicating a result of determining.

9. The observation apparatus according to claim 8, wherein the information display controller controls the display unit to display an image mark indicating a direction to the display section corresponding to at least one specimen section, and to change at least one of color, pattern, and brightness of the image mark based on the result of determining.

10. The observation apparatus according to claim 4, wherein the redisplay controller that reads the observation image associated with the area position corresponding to the display section from the storage unit for each display section, and controls the display unit to superimpose the observation image onto the display section in the section display image.

11. The observation apparatus according to claim 4, wherein the information obtaining unit obtains a section selecting information for selecting the display section, and the imaging controller controls the imaging unit to perform time-lapse imaging on the imaging area corresponding to the display section indicated by the section selecting information.

12. The observation apparatus according to claim 3, further comprising an information display controller that, when the information obtaining unit obtains the new position specifying information, compares the new area position with the area position stored in the storage unit to determine whether the new area position is already stored in the storage unit, and controls the display unit to display notice information indicating a result of determining.

13. The observation apparatus according to claim 3, wherein the information obtaining unit obtains a reference position information for specifying a reference position in the observation image, and the redisplay controller controls the display unit to redisplay the observation image including the reference position indicated by the reference position information so that a center of the observation image is the reference position.

14. The observation apparatus according to claim 13, wherein the imaging controller controls the imaging unit to perform time-lapse imaging on the imaging area a center of which is a position in the specimen corresponding to the reference position indicated by the reference position information.

15. The observation apparatus according to claim 1, wherein:
    the storage unit stores an imaging time indicating a time when the observation image is generated, the imaging time being associated with the observation image and the area position,
    the matching unit, when determining that the new area position is already stored in the storage unit, compares a current time with the imaging time associated with the new area position to determine whether an elapse time between the imaging time and the current time is not less than a predetermined time, and
    the imaging controller, when the elapse time is not less than the predetermined time, controls the imaging unit to image the specimen to generate the new observation image, and updates the observation image and the imaging time in the storage unit.

16. The observation apparatus according to claim 1, further comprising:
    a Z position predicting unit that (i) determines, when the new area position is within the imaging range of the imaging unit, whether the specimen is moved in a direction of an imaging optical axis of the imaging unit, (ii) stores the new area position when the specimen is moved in the direction of the imaging optical axis, and (iii) when a number of area positions corresponding to the movement of the specimen in the direction of the imaging optical axis stored in the storage unit is not less than two, predicts a destination position in the direction of the imaging optical axis suitable as the new area position based on at least two area positions among the area positions corresponding to the movement of the specimen in the direction of the imaging optical axis stored in the storage unit,
    wherein the movement controller controls the moving unit to move the specimen so that a position of the imaging area in the direction of the imaging optical axis coincides with the destination position.

17. An observation method for an observation apparatus, comprising:
    obtaining new position specifying information for specifying a new area position of a new imaging area in a specimen with respect to an imaging unit of the observation apparatus;
    controlling a moving unit of the observation apparatus to move the specimen so that the new area position is within an imaging range of the imaging unit;
    when the new area position is within the imaging range, comparing the new area position with the area position already stored in a storage unit to determine whether the new area position is already stored in the storage unit;
    controlling the imaging unit to image the new imaging area corresponding to the new area position to generate a new observation image;
    when the new area position is not yet stored in the storage unit, storing the new observation image in the storage unit;
    when the new observation image is stored in the storage unit by the storing, storing the new area position in the storage unit; and
    controlling an illumination unit of the observation apparatus to illuminate the specimen only during an imaging period when the imaging unit images the imaging area.

18. The observation method according to claim 17, wherein the controlling the illumination unit includes coinciding an illumination area of the illumination unit with imaging range of the imaging unit.

19. The observation method according to claim 17, further comprising:
    when the comparing determines that the new area position is already stored in the storage unit, controlling a display unit to display the observation image associated with the new area position and already stored in the storage unit,
    wherein the controlling the display unit to display the observation image is performed when the imaging unit generates the observation image.

* * * * *